(12) United States Patent
Kim et al.

(10) Patent No.: US 9,725,094 B2
(45) Date of Patent: Aug. 8, 2017

(54) METHOD AND APPARATUS FOR CONTROLLING POWER GENERATION LOAD BASED ON COASTING OPERATION

(71) Applicant: Hyundai Motor Company, Seoul (KR)

(72) Inventors: Dae-Kwang Kim, Yongin-si (KR); Hyo-Seong Wi, Suwon-si (KR); Jung-Hwan Bang, Seoul (KR); Jun-Yong Lee, Gwangmyeong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/954,656

(22) Filed: Nov. 30, 2015

(65) Prior Publication Data

US 2016/0347319 A1 Dec. 1, 2016

(30) Foreign Application Priority Data

May 29, 2015 (KR) .................. 10-2015-0076266

(51) Int. Cl.
| | |
|---|---|
| *B60W 30/18* | (2012.01) |
| *B60W 10/26* | (2006.01) |
| *B60W 10/30* | (2006.01) |
| *B60W 10/06* | (2006.01) |
| *B60R 16/03* | (2006.01) |

(52) U.S. Cl.
CPC ...... *B60W 30/18072* (2013.01); *B60W 10/06* (2013.01); *B60W 10/26* (2013.01); *B60W 10/30* (2013.01); *B60W 2510/101* (2013.01); *B60W 2510/244* (2013.01); *B60W 2520/10* (2013.01); *B60W 2540/10* (2013.01)

(58) Field of Classification Search
CPC .......... B60W 30/18; B60W 30/18072; B60W 10/26; B60W 10/30; B60R 16/03
USPC ............ 701/36, 102; 477/5, 37; 180/65.275, 180/65.265
See application file for complete search history.

(56) References Cited

U.S. PATENT DOCUMENTS

| | | | | |
|---|---|---|---|---|
| 6,376,927 | B1 * | 4/2002 | Tamai | B60K 6/383 |
| | | | | 290/31 |
| 2009/0133946 | A1 * | 5/2009 | Pels | B60K 6/46 |
| | | | | 180/65.275 |
| 2014/0074331 | A1 * | 3/2014 | Shin | B60W 20/14 |
| | | | | 701/22 |
| 2015/0088439 | A1 * | 3/2015 | Coffrin | H02J 3/005 |
| | | | | 702/60 |
| 2016/0068151 | A1 * | 3/2016 | Kim | B60W 20/106 |
| | | | | 701/22 |
| 2016/0288746 | A1 * | 10/2016 | Namuduri | F02N 11/08 |
| 2016/0355174 | A1 * | 12/2016 | Lee | B60K 6/387 |

FOREIGN PATENT DOCUMENTS

| | | |
|---|---|---|
| JP | 2012-200095 A | 10/2012 |
| KR | 10-1371476 B1 | 3/2014 |

* cited by examiner

*Primary Examiner* — Tan Q Nguyen
(74) *Attorney, Agent, or Firm* — Morgan Lewis & Bockius LLP

(57) ABSTRACT

A method for controlling power generation load based on coasting operation may include a first control step for judging whether a coasting operation is being executed, and a step for controlling the power generation load of a generator based on the charged level of a battery if the operation is judged as a coasting operation.

12 Claims, 7 Drawing Sheets

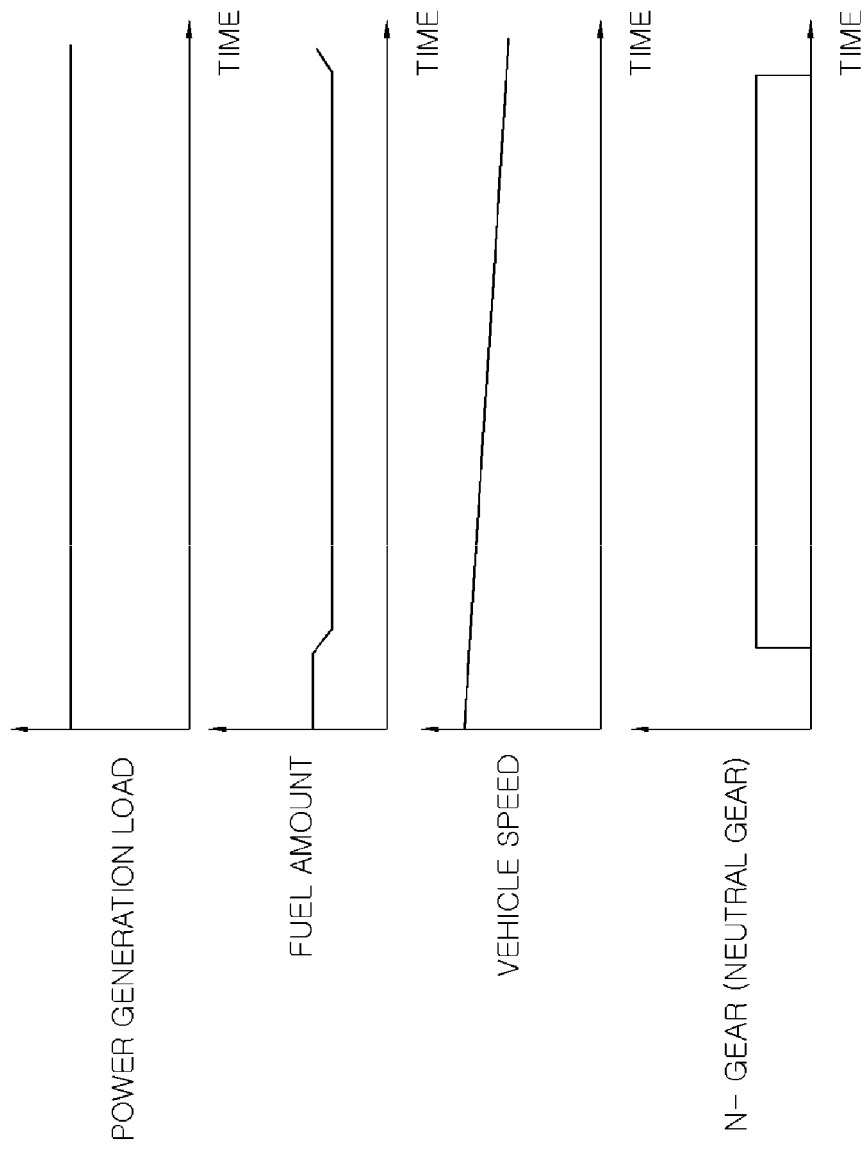

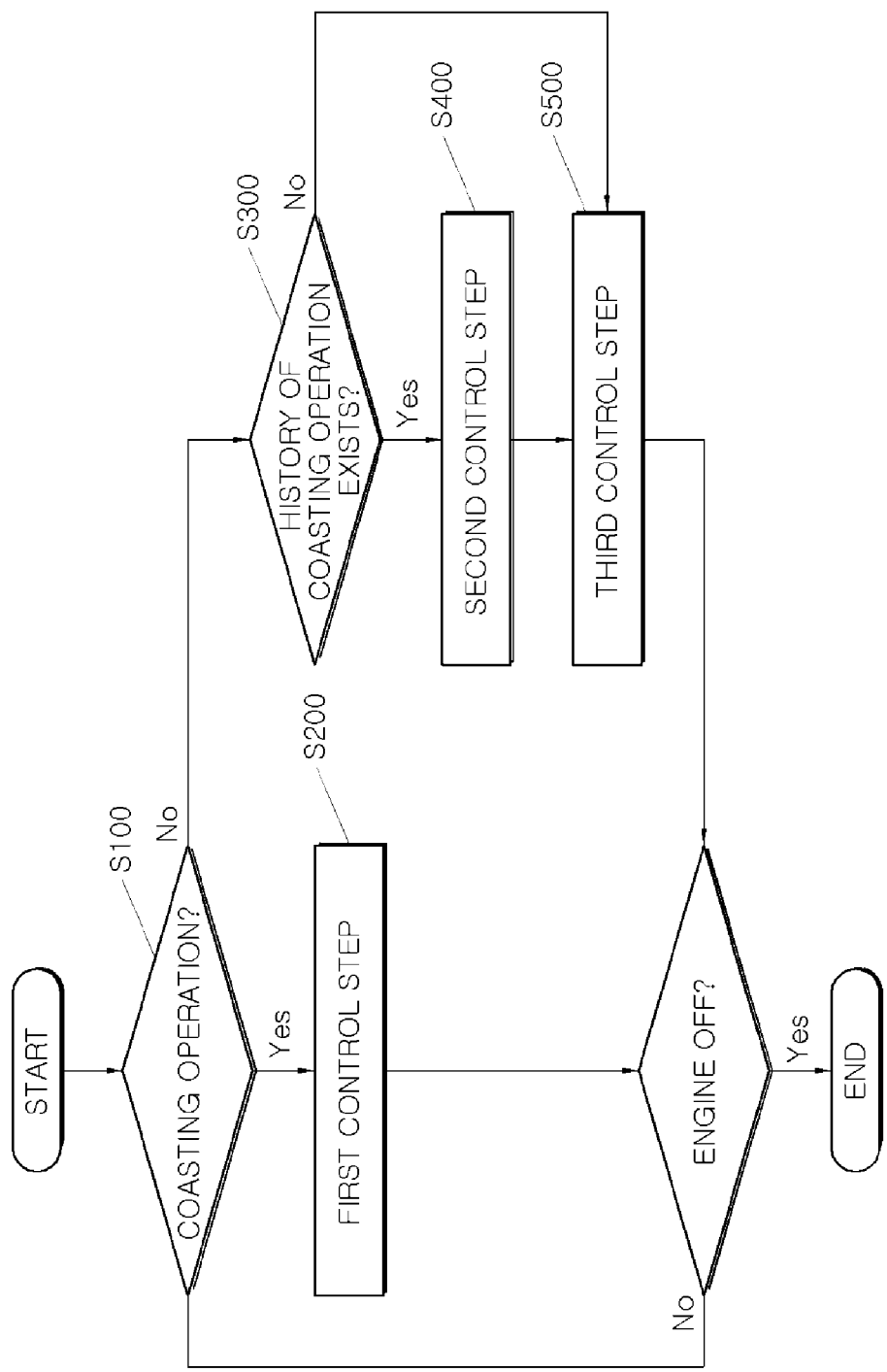

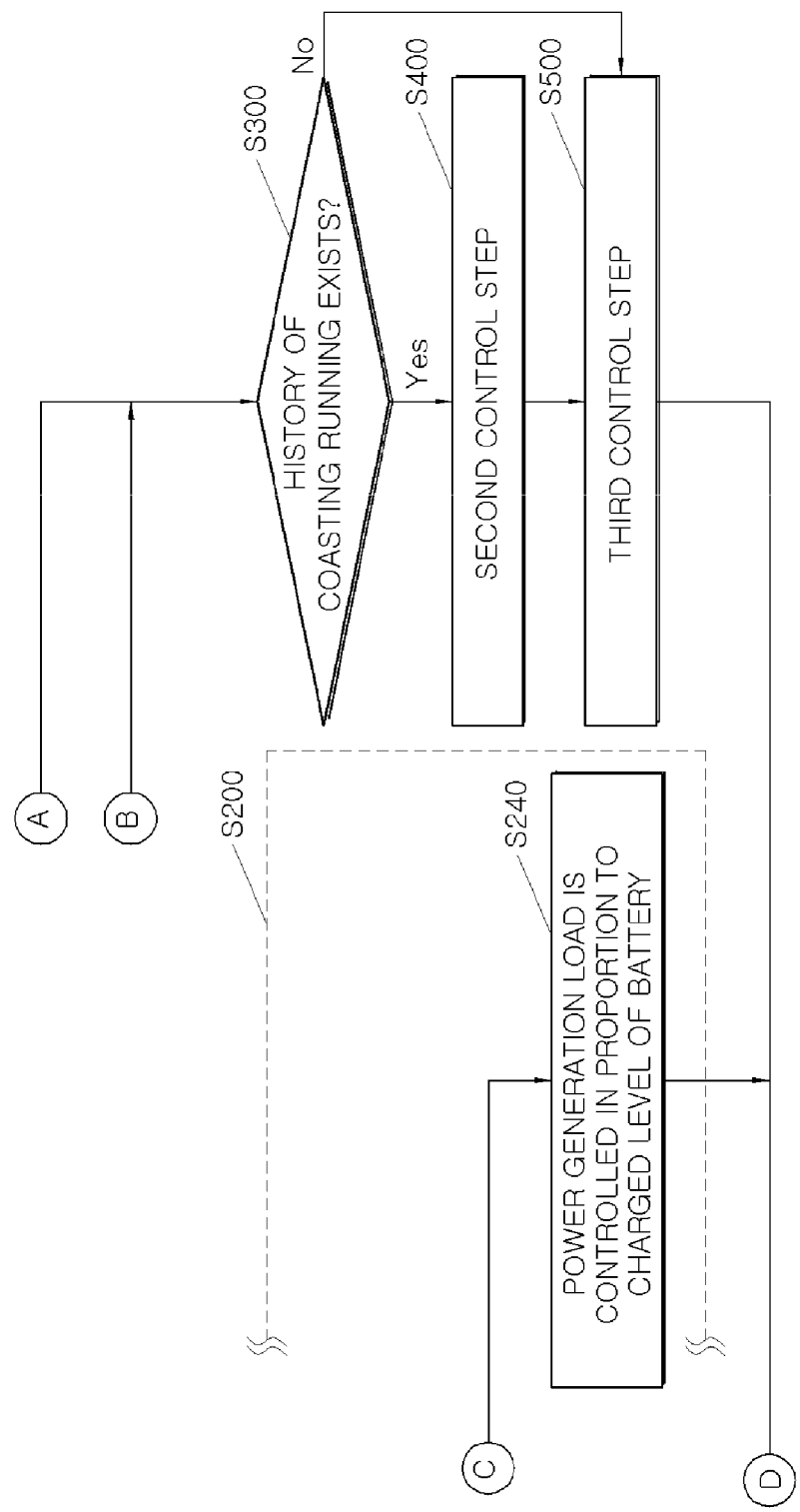

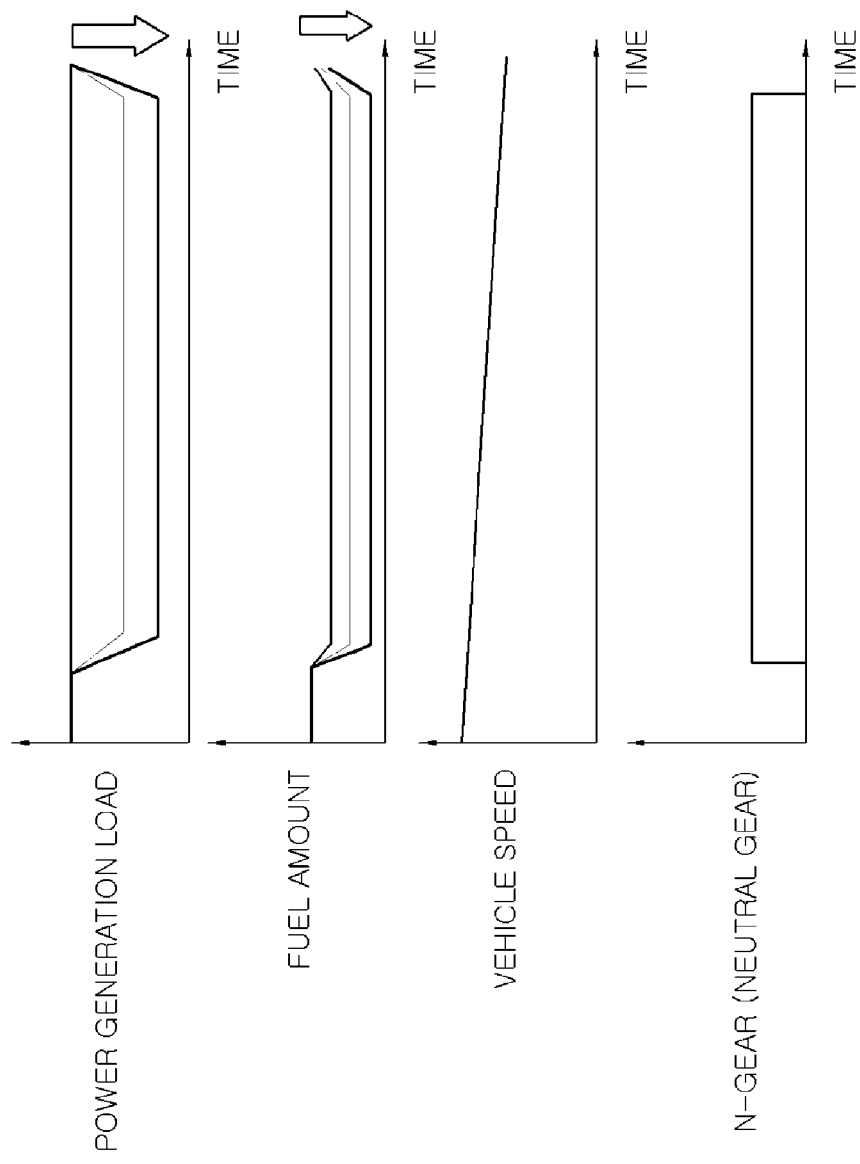

METHOD AND APPARATUS FOR CONTROLLING POWER GENERATION LOAD BASED ON COASTING OPERATION

CROSS-REFERENCE TO RELATED APPLICATIONS

The present application claims priority to Korean Patent Application No. 10-2015-0076266, filed on May 29, 2015, which is incorporated herein by reference in its entirety.

BACKGROUND OF THE INVENTION

Field of the Invention

Exemplary embodiments of the present invention relate to a method and apparatus for controlling power generation load based on a coasting operation; and, particularly, to a method and apparatus for controlling power generation load based on a coasting operation which allow to efficiently collect inertial energy and improve fuel efficiency in such a way to differently control power generation load based on a coasting operation and a history of the coasting operation.

Description of Related Art

To improve fuel efficiency in preparation for rising oil price, it needs to efficiently control power generation load of a generator based on the running condition of a vehicle.

For example, as illustrated in FIG. 1, a generator 12 driven by an engine 11 allows to generate power while maintaining a set voltage through a regulator 12a, and the engine 11 and the generator 12 are configured to transfer information of the engine 11 and the generator 12 to an ECU 13 and are controlled by the ECU 13. The ECU 13 receives information through a sensor 16 with respect to a battery 14 charged by the generator 12 and controls the engine 11, the generator 12 and a cooling fan 17 and supplies electric power from the battery 14 to electric loads 15 of a vehicle.

The vehicle with the above power generation system increases the load of the generator in the deceleration mode wherein fuel is less consumed and stores in the battery, and in the mode wherein fuel is more used, supplies to electric loads of the vehicle using the energy stored in the battery, thus improving fuel efficiency by reducing the generation of power.

In the conventional power generation control, if fuel cut occurs in the deceleration mode, the kinetic energy of the vehicle, which was running in the inertial mode by maximally increasing the voltage from the generator, is converted into electric energy. At this time, in the fuel cut operation mode wherein the vehicle runs without any brake operation, the vehicle will decelerate because of the friction force of the engine.

Meanwhile, if the power generation voltage of the generator is increased during the fuel cut operation wherein the vehicle runs without any operation of the brake, the friction force of the engine further increases as high as the load of power generation, thus reducing the duel cut operation time of the engine.

The above-described control may not be an effective way as compared to the control method wherein fuel efficiency has priority, for enhancing fuel efficiency in such a way to maintaining the fuel cut operation time as long as possible.

In the conventional art proposed to resolve the above-mentioned problems, when the vehicle starts a fuel cut operation, the power generation load of the generator is increased if deceleration is high given the deceleration of the vehicle, and in other occasions, the vehicle is controlled by maintaining long the fuel cut operation time while keeping low the power generation load. However, since the coasting operation section in the conventional art is not considered an energy recovery section, the vehicle has been controlled in the same way as the conventional control during the coasting operation of the vehicle. Here, the coasting operation of the vehicle represents that if a driver steps off an accelerator pedal at a prejudged vehicle speed so as to improve fuel efficiency, the vehicle is forced to run in the inertial mode by disconnecting the transfer of the driving force to the engine and the transmission. In the conventional vehicle control, if the load of the generator increases in the coasting operation section, the coasting running section may become short, which may have bad effect on the improvement of the fuel efficiency.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a technology for differently controlling power generation load based on a coasting operation and a history of the coasting operation.

To achieve the above objects, there is provided a method for controlling power generation load based on coasting operation, which may include a step S100 for judging whether a coasting operation is being executed; and a first control step S200 for controlling the power generation load of a generator based on the charged level of a battery if the operation is judged as a coasting operation.

There is provided a coasting operation history judgment step S300 wherein if the operation is not the coasting operation, it is judged if the coasting operation has been executed in the previous running cycle.

There is provided a second control step S400 wherein if it is judged that the coasting operation has been executed in the previous running cycle, the power generation load of the previous running cycle is maintained for a previously set time period.

There is provided a third control step S500 wherein after the second control step S400, the power generation load is controlled based on the deceleration of the vehicle.

If it is judged that the coasting operation has not been executed in the previous running cycle, the third control step S500 is executed.

The step S100 for judging the coasting operation may include a step S110 for judging whether the speed of the vehicle is over a previously set speed.

The step S100 for judging the coasting operation may include a step S120 for judging whether the open degree of the accelerator pedal is below a previously open degree in case where the speed of the vehicle is over a previously set speed, and whether the gear is in the neutral position.

The first control step S200 may include a step S210 for detecting the charged level of the battery, and the first control step S200 may include a step S220 for judging whether the battery is charged full, a step S230 for minimally controlling the power generation load of the generator if the battery is charged full, and a step S240 for controlling the power generation load of the battery in proportion to the charged level of the battery if the battery is not charged full.

To achieve the above object, according to another exemplary embodiment of the present invention, there is provided a storing medium which stores a method for controlling power generation load based on a coasting operation.

To achieve the above object, there is provided an apparatus for controlling power generation load based on a coasting operation, which may include the storing medium, a generator which generates electric current using a kinetic energy of a vehicle; a battery which charges the electric current generated by the generator and supplies the electric current to the vehicle which needs such an electric current; a detection unit which detects the state of the vehicle; and a control unit which controls, using the information from the detection unit, the power generation load of the generator based on the method for controlling power generation load based on the coasting operation stored in the storing medium.

The detection unit may include an accelerator pedal detection unit which detects the open degree of the accelerator pedal; a vehicle speed detection unit which detects the speed of the vehicle; a gear shift detection unit which detects if the gear is in the neutral position; and a battery detection unit which detects the charged level of the battery.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a view for describing a power generation control during a coasting operation of a conventional power generation system of a vehicle.

FIG. 3, FIG. 4A and FIG. 4B are flow charts illustrating a method for controlling a power generation load based on a coasting operation according to an exemplary embodiment of the present invention.

FIG. 6 is a view for describing effects of the present invention.

Figure 1:
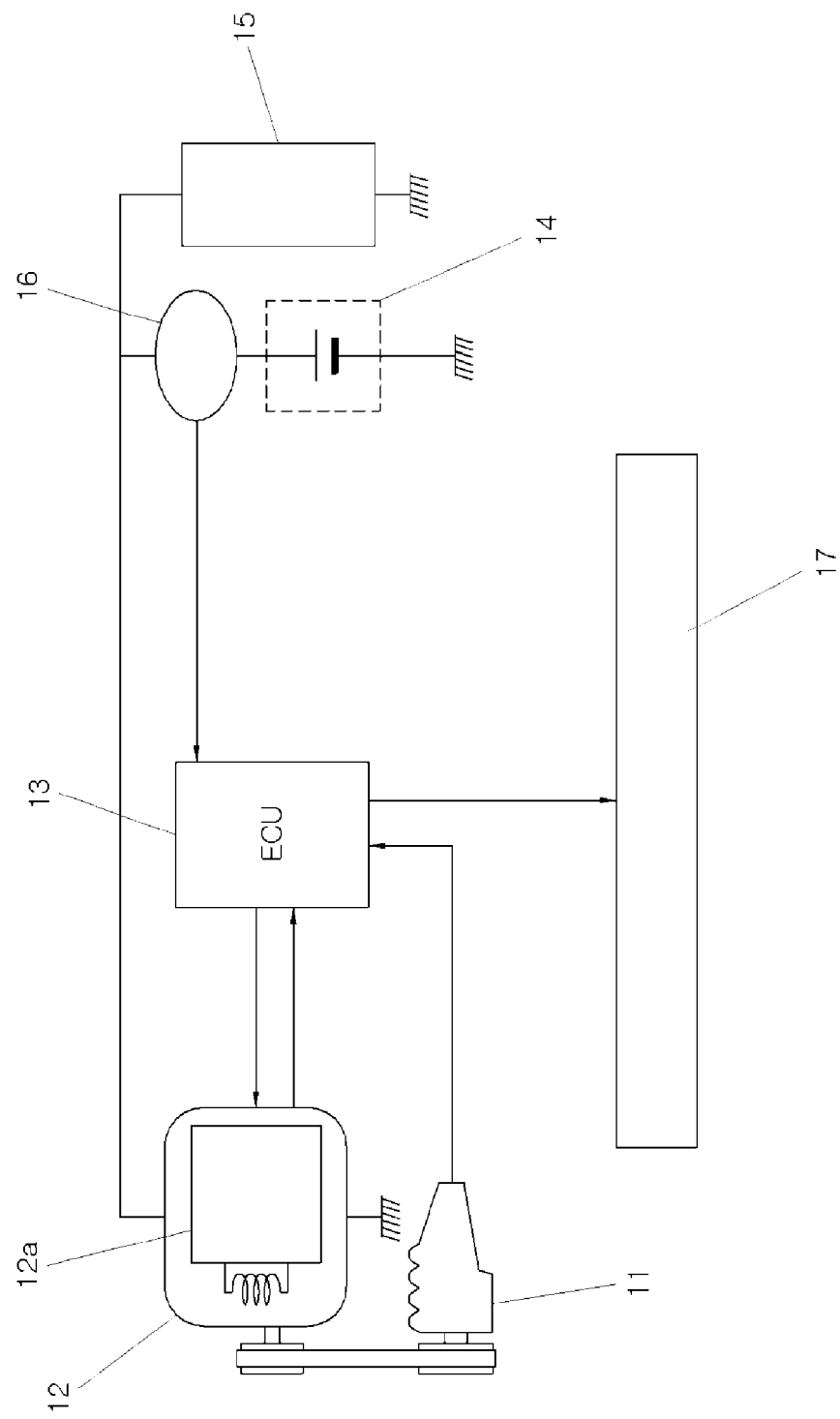
FIG. 1 is a block diagram illustrating a conventional power generation system of a vehicle.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The terms and words used in the specification and claims should not be construed as their ordinary or dictionary sense. On the basis of the principle that the inventor can define the appropriate concept of a term in order to describe his/her own invention in the best way, it should be construed as meaning and concepts for complying with the technical idea of the present invention. Accordingly, the embodiments described in the present specification and the construction shown in the drawings are nothing but one exemplary embodiment of the present invention, and it does not cover all the technical ideas of the invention. Thus, it should be understood that various changes and modifications may be made at the time of filing the present application. In addition, detailed descriptions of functions and constructions well known in the art may be omitted to avoid unnecessarily obscuring the gist of the present invention. Exemplary embodiments of the present invention will be described below in more detail with reference to the accompanying drawings.

Figure 4A:
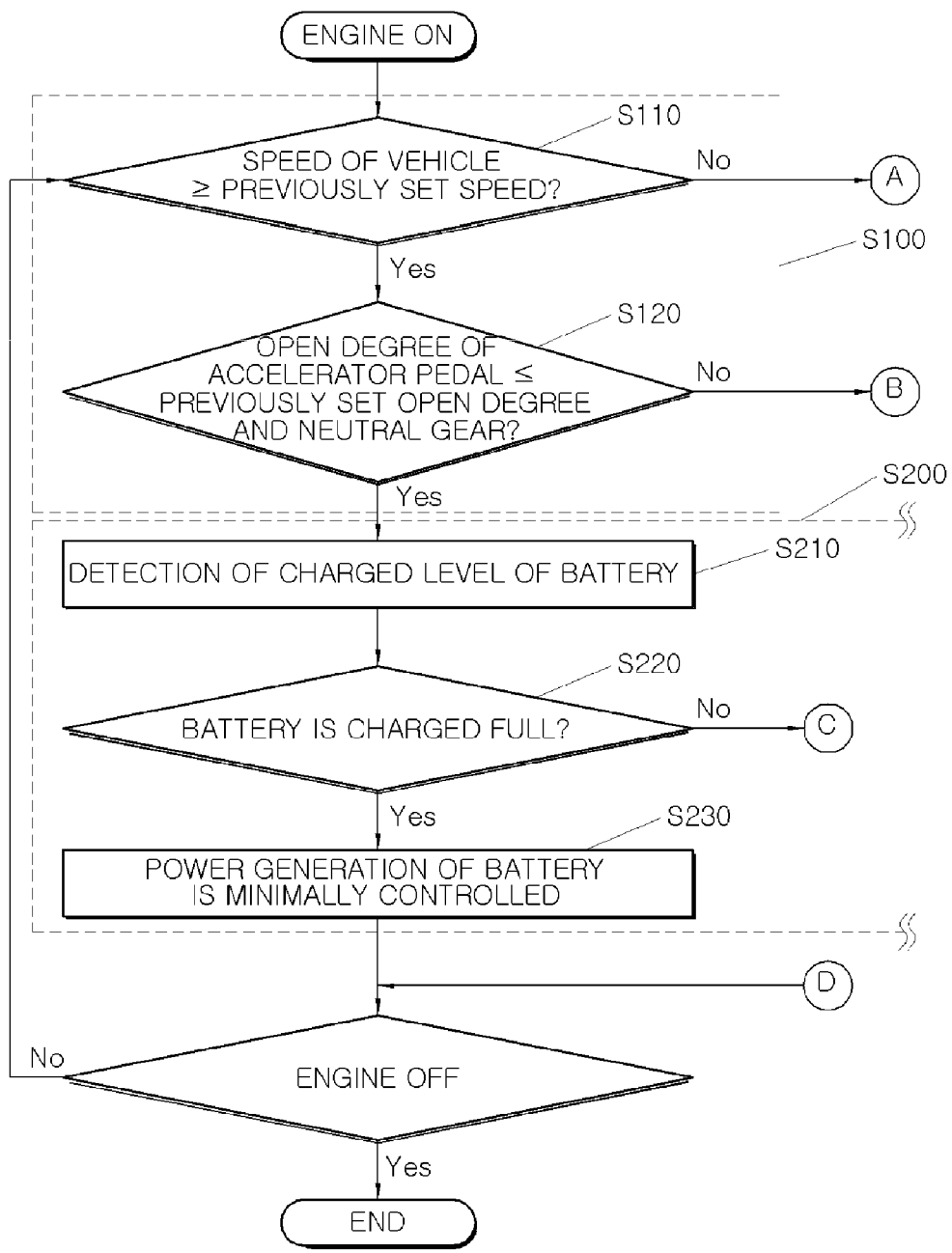

FIGS. 3, 4A and 4B are flow charts illustrating a method for controlling a power generation load based on a coasting operation according to an exemplary embodiment of the present invention. Referring to FIGS. 3, 4A and 4B, the method for controlling power generation load based on coasting operation may include, but is not limited to, a step S100 for judging if a coasting operation is being executed, a step S200 for controlling the power generation load of a generator based on the charged level of a battery if the operation is judged as a coasting operation, a coasting operation history judgment step S300 wherein if the operation is not the coasting operation, it is judged if the coasting operation has been executed in the previous running cycle, a second control step S400 wherein if it is judged that the coasting operation has been executed in the previous running cycle, the power generation load of the previous running cycle is maintained for a previously set time period, and a third control step S500 wherein after the second control step S400, the power generation load is controlled based on the deceleration of the vehicle. In addition, if it is judged that the coasting operation has not been executed in the running cycle, the third control step S500 is performed.

Here, the step S100 for judging the coasting operation may include, but is not limited to, at least one among a step S110 for judging if the speed of the vehicle is a previously set speed, a step S120 for judging if the open degree of the accelerator pedal is below a previously set open degree and a step S130 for judging if the gear is in the neutral position. Namely, if the speed of the vehicle is over a prejudged speed and a driver does not step on the accelerator pedal, an engine transmission controller automatically gets into the neutral gear, so the vehicle can start the coasting operation wherein the vehicle can run in the inertial mode.

The first control step S200 may include, but is not limited to, a step S210 for detecting the charged level of the battery, a step S220 for judging if the battery is charged full, a step S230 for minimally controlling the power generation load of the generator if the battery is charged full, and a step S240 for controlling the power generation load of the battery in proportion to the charged level of the battery if the battery is not charged full. Namely, if the vehicle starts the coasting operation, the first control step S200 is executed, and at this time, power generation load may be differently controlled based on the charged level of the battery. If the battery is charged full, the coasting operation section is controlled maximum by minimally controlling the power generation load, thus enhancing fuel efficiency. If the battery is not charged full, the power generation load is controlled in proportion to the charged level of the battery. Namely, if the charged level of the battery is low, the power generation load is controlled to be high, thus significantly increasing the charged level of the battery even though the coasting operation section decreases. If the charged level of the battery is high, the power generation load is controlled to be small, thus minimizing the decrease of the coasting operation section while slightly increasing the charged level of the battery.

In the coasting operation history judgment step S300, it is judged if the coasting operation has been executed in the previous running cycle. In the second control step S400, if it is judged that the coasting operation has been performed in the previous running cycle, the power generation load of the previous running cycle is maintained during the previously set time period, and in the third control step S500, the power generation load is controlled based on the deceleration of the vehicle. If it is judged that the coasting operation has been executed, the power generation load of the previous running cycle will be temporally maintained in order to prevent any variation in the power generation load in the section where the operation changes from the coasting operation to the normal operation. At this time, the third control step S500 may allow to control the power generation load based on the conventional technology (Korean Patent Laid-open No. 10-2014-0045707). In addition, if it is judged that the coasting operation has not been executed in the previous running cycle, the power generation load will be controlled based on the third control step S500 without having the second control step S400 performed.

Figure 5:
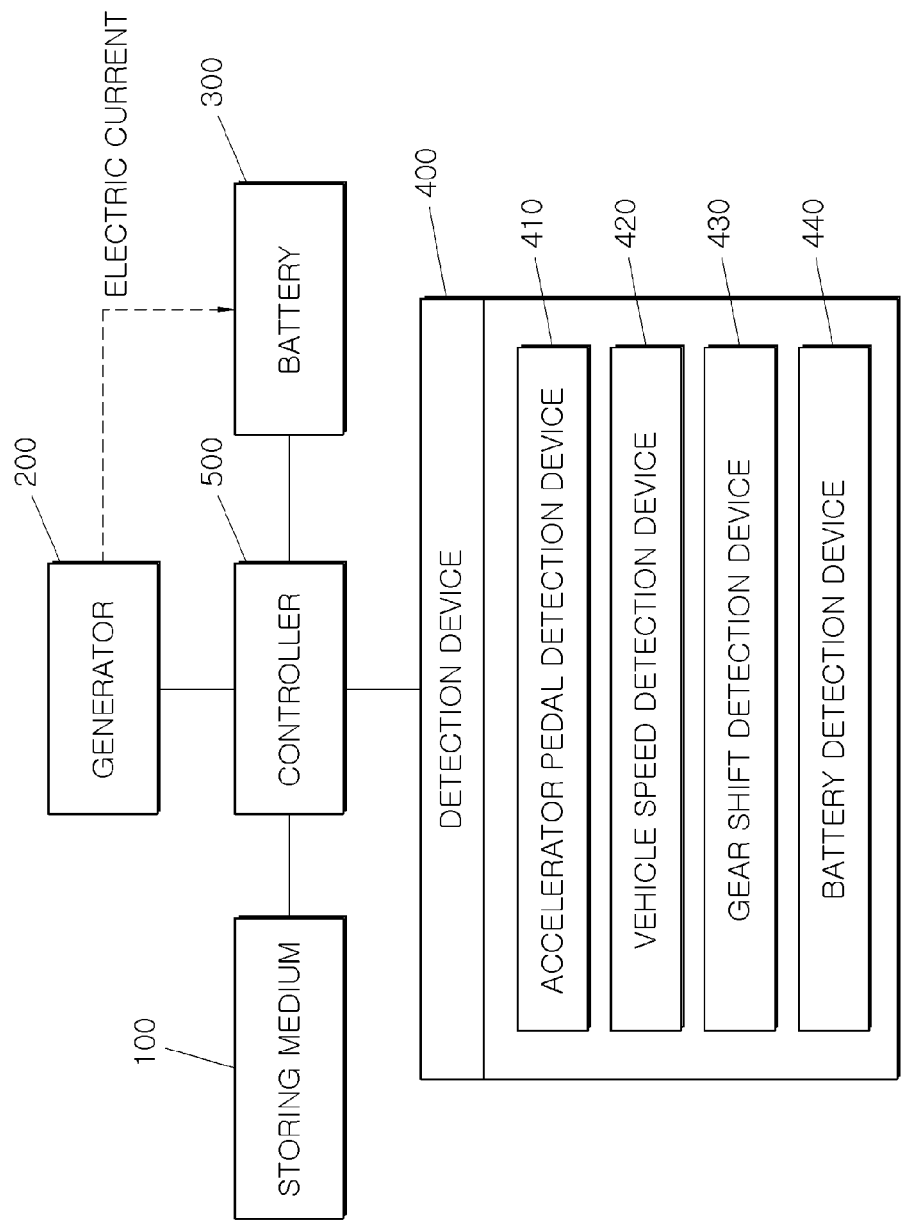
FIG. 5 is a block diagram illustrating an apparatus for controlling a power generation load based on a coasting operation according to another exemplary embodiment of the present invention.

FIG. 5 is a block diagram illustrating an apparatus for controlling a power generation load based on a coasting operation according to another exemplary embodiment of the present invention. Referring to FIG. 5, the apparatus for controlling the power generation load based on coasting operation according to another exemplary embodiment of the present invention may include, but is not limited to, the storing medium, a generator 200 which generates electric current using a kinetic energy of a vehicle, a battery 300 which charges the electric current generated by the generator 200 and supplies the electric current to the vehicle which needs such an electric current, a detection unit 400 which detects the state of the vehicle, and a controller 500 which controls, using the information from the detection unit 400, the power generation load of the generator 200 based on the method for controlling power generation load based on the coasting operation stored in the storing medium 100.

The detection unit 400 may include, but is not limited to, an accelerator pedal detection unit 410 which detects the open degree of the accelerator pedal, a vehicle speed detection unit 420 which detects the speed of the vehicle, a gear shift detection unit 430 which detects if the gear is in the neutral position, and a battery detection unit 440 which detects the charged level of the battery.

FIG. 6 is a view for describing the effect of the present invention. Referring to FIG. 6, the present invention is directed to a technology wherein the power generation load can be maintained as low as possible during the coasting operation (the engine controller automatically gets into the neutral gear if the vehicle speed is over a prejudged level after a driver steps off the accelerator pedal, so the vehicle can run in the inertial mode). For this, it is possible to confirm that fuel efficiency (or fuel consumption amount) can be improved as compared to the conventional art in FIG. 2.

According to an exemplary embodiment of the present invention, it is possible to improve fuel efficiency while reducing the consumption amount of fuel of an engine by minimizing the power generation load during a coasting operation.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling power generation load based on a coasting operation, comprising:
   a first control step for judging whether the coasting operation is being executed;
   a step for controlling the power generation load of a generator based on the charged level of a battery when an operation is judged as the coasting operation; and
   a coasting operation history judgment step wherein when the operation is not the coasting operation, it is judged when the coasting operation has been executed in a previous running cycle.

2. The method of claim 1, comprising:
   a second control step wherein when it is judged that the coasting operation has been executed in the previous running cycle, the power generation load of the previous running cycle is maintained for a previously set time period.

3. The method of claim 1, comprising:
   a third control step wherein after the second control, the power generation load is controlled based on the deceleration of the vehicle.

4. The method of claim 1, wherein when it is judged that the coasting operation has not been executed in the previous running cycle, the third control step is executed.

5. The method of claim 1, wherein the step for judging the coasting operation comprises a step for judging whether the speed of the vehicle is over a previously set speed.

6. The method of claim 5, wherein the step for judging the coasting operation comprises a step for judging whether the open degree of the accelerator pedal is below a previously open degree in case where the speed of the vehicle is over a previously set speed, and whether the gear is in the neutral position.

7. The method of claim 1, wherein the first control step comprises a step for detecting the charged level of the battery.

8. The method of claim 7, wherein the first control step comprises a step for judging whether the battery is charged full.

9. The method of claim 8, comprising:
a step for minimally controlling the power generation load of the generator when the battery is charged full.

10. The method of claim 8, comprising:
a step for controlling the power generation load of the battery in proportion to the charged level of the battery when the battery is not charged full.

11. An apparatus for controlling power generation load based on a coasting operation, comprising:
the storing medium which stores a method for controlling power generation load based on the coasting operation;
a generator which generates electric current using a kinetic energy of a vehicle;
a battery which charges the electric current generated by the generator and supplies the electric current to the vehicle which needs such an electric current;
a detection device which detects the state of the vehicle; and
a controller which controls, using the information from the detection device, the power generation load of the generator based on the method for controlling power generation load based on the coasting operation stored in the storing medium,
wherein the controller judges whether the coasting operation has been executed in a previous running cycle, if an operation is not the coasting operation.

12. The apparatus of claim 11, wherein the detection device comprises:
an accelerator pedal detection device which detects the open degree of the accelerator pedal;
a vehicle speed detection device which detects the speed of the vehicle;
a gear shift detection device which detects whether the gear is in the neutral position; and
a battery detection device which detects the charged level of the battery.

* * * * *